(12) United States Patent
Bianchi et al.

(10) Patent No.: US 9,482,793 B2
(45) Date of Patent: *Nov. 1, 2016

(54) LIQUID LENS IMAGE CAPTURE DEVICE

(71) Applicant: Datalogic IP Tech S.r.l., Lippo di Calderara di Reno (IT)

(72) Inventors: Maurizio Bianchi, Castel Maggiore (IT); Davide Bruni, Casalecchio di Reno (IT); Renato Rigutti, Zola Predosa (IT); Bassam Hallal, Bologna (IT); Federico Canini, Zola Predosa (IT)

(73) Assignee: DATALOGIC IP TECH S.R.L., Lippo di Calderara di Reno, (Bologna) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,460

(22) Filed: Apr. 17, 2014

(65) Prior Publication Data
US 2014/0247503 A1 Sep. 4, 2014

Related U.S. Application Data

(63) Continuation of application No. 13/142,645, filed as application No. PCT/IT2008/000810 on Dec. 30, 2008, now Pat. No. 8,743,263.

(51) Int. Cl.
*G02B 3/14* (2006.01)
*G02B 26/00* (2006.01)
*G03B 3/10* (2006.01)

(52) U.S. Cl.
CPC ............... *G02B 3/14* (2013.01); *G02B 26/004* (2013.01); *G03B 3/10* (2013.01)

(58) Field of Classification Search
None
See application file for complete search history.

(56) References Cited

U.S. PATENT DOCUMENTS

| 5,378,883 | A | 1/1995 | Batterman et al. | |
|---|---|---|---|---|
| 6,094,021 | A | * | 7/2000 | Noro et al. ............... 318/400.29 |
| 6,369,954 | B1 | 4/2002 | Berge et al. | |
| 6,431,452 | B2 | 8/2002 | Feng | |
| 6,538,823 | B2 | 3/2003 | Kroupenkine et al. | |
| 6,545,815 | B2 | 4/2003 | Kroupenkine et al. | |
| 6,545,816 | B1 | 4/2003 | Kroupenkine et al. | |

(Continued)

FOREIGN PATENT DOCUMENTS

CN 101019129 A 8/2007
EP 1870740 A1 * 12/2007

(Continued)

OTHER PUBLICATIONS

Office Action dated May 30, 2014 issued in corresponding Chinese Patent Application No. 200880132595.9.

(Continued)

*Primary Examiner* — Kimberly N Kakalec
*Assistant Examiner* — James McGee
(74) *Attorney, Agent, or Firm* — Duane Morris LLP

(57) ABSTRACT

An image capture module includes a liquid lens having a first and a second electrode, and a first and a second conductor element in electrical contact with the first and second electrode, respectively, the first and second conductor elements being each intended for connection with a voltage generator for driving the liquid lens. The first conductor element includes an electrically conductive body having a peripheral region for contact with the first electrode of the liquid lens with a light diaphragm aperture in a central region thereof.

15 Claims, 13 Drawing Sheets

(56) References Cited

U.S. PATENT DOCUMENTS

| | | |
|---|---|---|
| 6,634,554 B1 | 10/2003 | Merchant |
| 7,043,153 B2 | 5/2006 | Takeyama et al. |
| 7,073,715 B2 | 7/2006 | Patel et al. |
| 7,083,096 B2 | 8/2006 | Breytman et al. |
| 7,195,164 B2 | 3/2007 | Patel |
| 7,222,793 B2 | 5/2007 | Patel |
| 7,264,162 B2 | 9/2007 | Barkan |
| 7,303,131 B2 | 12/2007 | Carlson et al. |
| 7,646,545 B2 | 1/2010 | Tanaka |
| 8,027,096 B2 | 9/2011 | Feng |
| 2001/0017985 A1 | 8/2001 | Tsuboi et al. |
| 2007/0063048 A1 | 3/2007 | Havens et al. |
| 2007/0131770 A1 | 6/2007 | Nunnink |
| 2007/0149939 A1 | 6/2007 | Tanaka |
| 2008/0037973 A1 | 2/2008 | Jung |
| 2008/0144185 A1 | 6/2008 | Wang |
| 2008/0204891 A1 | 8/2008 | Tallaron et al. |
| 2008/0239509 A1 | 10/2008 | Vinogradov |
| 2008/0304160 A1 | 12/2008 | Hendriks et al. |
| 2010/0284091 A1 | 11/2010 | Okamoto |
| 2011/0149410 A1 | 6/2011 | Blum |
| 2011/0211262 A1 | 9/2011 | Craen et al. |
| 2012/0248195 A1 | 10/2012 | Feng et al. |

FOREIGN PATENT DOCUMENTS

| | | |
|---|---|---|
| EP | 1906213 A | 4/2008 |
| JP | 2006 012247 A | 12/2006 |
| WO | WO2005/103768 A2 | 11/2005 |

OTHER PUBLICATIONS

Office Action issued on Nov. 12, 2013 in corresponding Chinese Patent Application No. 200880132595.9.

International Search Report and Written Opinion dated Aug. 26, 2009 from corresponding PCT Application No. PCT/IT2008/000810.

Office Action issued on Dec. 20, 2012, in corresponding Chinese Patent Application No. 200880132595.9.

* cited by examiner

LIQUID LENS IMAGE CAPTURE DEVICE

CROSS-REFERENCE TO RELATED APPLICATIONS

The present application is a continuation of and claims priority to U.S. application Ser. No. 13/142,645 filed Jul. 28, 2011, the entirety of which is hereby incorporated by reference herein.

BACKGROUND AND SUMMARY OF THE INVENTION

The present invention relates to the field of image capture devices, in particular images containing coded optical information. More in particular, the invention relates to an image capture module for such a device, comprising a liquid lens. The invention also relates to an electro-optical element for such an image capture module, and an image acquisition device which comprises such a module.

In the present description and attached claims, under "coded optical information" or in brief "optical code" it is intended to mean any graphical representation having the function of storing coded information by means of a suitable combination of elements of pre-established shape, for examples squares, rectangles or hexagons, of dark colour (normally black) separated by light colours (spaces, normally white), such as bar codes, stacked codes, i.e. with several superimposed bar sequences, and two-dimensional codes in general, colour codes, etc., as well as alphanumeric characters and particular shapes or patterns such as stamps, logos, signatures etc.

The expression "image" and in particular "optical code" comprises graphical representations detectable not only in the visible light range, rather also in the wavelength range comprised between infrared and ultraviolet. In the present description and attached claims, under "light" it is intended to generally mean any radiation suitable for capturing an image, and in particular for detecting an optical code.

The capture devices of images containing coded information are commonly known as optical code readers of the imager type, in particular bar code readers of the imager type.

Falling within the scope of the invention are imager readers capable of capturing pictures or films and/or capable of capturing images of documents for automatic character recognition or for "document handling" applications.

Such imager devices comprise an image capture module generally comprising a linear or matrix photo-sensitive device or pixel array sensor, and optics for focusing the light onto the pixel array sensor.

Besides a resolution limit in terms of pixels, dictated by the pixel array sensor, any imager device has as a further limit its own depth of field or DoF, which is the distance range at which the device is able to capture the image with suitable focusing, depending on the optics. It is manifest that in the case of imager devices of both the manual and the fixed type, such as for example bar code readers on conveyors used for example in applications at airports for sorting luggage, there is often the need to increase the depth of field.

A first expedient for increasing the depth of field consists of providing several readers or image capture modules having respective optics differently focused. In U.S. Pat. No. 7,195,164, one of the image capture modules mounted inside a reader can in turn have variable focus. Providing for more than one image capture module is nevertheless costly and creates a complex architecture that is hard to manage.

Several variable, in particular automatic, focusing systems are well known. The most common and simple, used for example in cameras and video cameras, is based on an electric motor that, by physically moving the optics or a part thereof, changes the focal length of the system. Typically, an objective is provided comprising a first fixed group of lenses (fixed or primary optics) and a second group of lenses, moved by the motor. The second group of lenses is called the afocal part of the objective, since it is not capable on its own to form an image onto a plane, and must always be coupled with primary optics.

One such focusing system is described for example in U.S. Pat. No. 7,303,131, U.S. Pat. No. 6,431,452 and U.S. Pat. No. 5,378,883. The suitable focal length can be established through a measurement of the distance which separates the reader from the support or target on which there is the bar code to be read. The distance measurement method proposed in such documents is based on the use of a laser pointer, with which the reader is provided. If the distance measurement fails, the system identifies the desired focus by comparing different sample images taken with different focusing conditions.

In U.S. Pat. No. 7,222,793, an electric motor does not move a lens, rather a mirror, so as to direct a light beam along different optical paths, characterised by different focal lengths. The focusing system therefore allows preset and selectable focal lengths to be obtained.

Recently, technology started to offer actuators different from the traditional electric motors, which can be used for mechanically moving parts of the optics of an imager device. "Voice coils", i.e. motors which exploit sound wave propagation for mechanically moving axes, as well as piezoelectric actuators, are part of this class. For example, in U.S. Pat. No. 7,083,096 a piezoelectric actuator is used for moving a lens group and obtaining the best focus position; the method used for deciding the positioning is based on distance measurement. In U.S. Pat. No. 6,634,554, a focusing system is described in wherein a piezoelectric actuator modifies the deflection angle of a mirror, thus changing the optical path and thus the focusing length of the system.

However, voice coils are bulky devices. Piezoelectric actuators are costly, rather noisy, are not very reliable, and have an insufficiently long operating lifetime. A piezoelectric motor rarely reaches a million cycles, while a bar code reader is typically used a few thousands times a day, and thus reaches a million cycles already during its first operating year.

Moreover, the focus variation, in particular autofocus, systems based on the movement of parts typically have relatively long response times. Providing only two selectable focusing positions, as described for example in U.S. Pat. No. 7,073,715, allows obtaining a faster response of the system; however the response is still poorly suited, in particular for coded information readers.

Indeed, an important factor to be taken into account in the field of optical code readers is the decoding time, i.e. the time that elapses between the activation of the reader, whether caused by a human operator pressing the trigger or by an automatic system, and the decoding. During such decoding time, the correct focusing of the system must occur, among other things. In the case of manual readers, this time should not exceed six hundred milliseconds, since beyond such time the operator perceives the reader as being very slow. In the field of automatic optical code readers, the decoding time should be even shorter, on the order of a few millisecond units.

In order to obtain a quick response of the focusing system, in particular in the field of optical code readers, liquid lens capture modules have recently been developed.

In brief, as shown in FIG. 1, a liquid lens 400 comprises two immiscible fluids 401, 402 in contact with each other, one being a conductor 401 and one being an insulator 402, having different refractive indices. The shape of the interface 403 (meniscus) between the two fluids, and consequently the optical path through the liquid lens 400, can be changed by means of some variables, such as for example the quantity of the two fluids 401, 402, the pressure applied thereto, and, of particular interest with regard to the invention, the voltage applied to its electrodes 404, 408, one of which being in contact with the conductor fluid. The shape variation of the interface 403 and consequently of the optical path can be controlled to change in particular the dioptric power, namely the focal length, of the lens 400.

Further details on liquid lenses can be found in U.S. Pat. No. 6,369,954 B1, which describes their architecture, and in US 2008/0204891 A1, related to driving methods aimed at obtaining a quick response of the liquid lens to electrical bias, incorporated herein by reference.

In US 2007/0131770 A1, a digital image capture device is disclosed, with two focus positions obtained by means of a liquid lens. The selection between the two focus positions is operated, for example, based on a distance measure. The control of the two focus positions is of so-called open loop type, i.e. no measurement is carried out on the effective attainment of the desired focus condition, moving instead from the assumption that the system parameters are sufficiently repeatable and reliable.

US 2007/0063048 A1 teaches to carry out a calibration of the drive signal of a liquid lens reader in order to compensate for the effects on the behaviour of the specific liquid lens of various factors such as temperature, ambient pressure, ageing of the fluids, vibrations and accelerations, etc.

However, the latest generation liquid lenses are very stable and hence the temperature compensation can be omitted, in particular when the drive signal is feedback controlled by focus condition achievement indexes.

Such document moreover discloses a drive circuit for the liquid lens, comprising a direct voltage generator with adjustable output and an H-bridge circuit having four transistor switches, of the FET type. A switch circuit controls the state of the switches so as to alternately close the pairs of switches arranged in opposite branches of the bridge, thus driving the liquid lens by means of a square wave voltage. Alternatively, the document teaches driving by means of square waves generated by an integrated drive circuit such as those used for electroluminescent lamps in mobile phones.

Similarly, liquid lens manufacturers propose drive schemes based on integrated circuits designed for generating, by means of an H-bridge, the high voltage necessary for driving a power load such as an electric motor or an electroluminescent lamp for back-lighting displays. The four switches of the H-bridge must therefore be capable of conducting a current of relatively high value, necessary for driving such power load. When implemented with solid-state switches, two N-mos transistors and two P-mos power transistors may be used. The latter must however be driven by a gate voltage on the order of magnitude of the voltage applied to the source, i.e. tens of Volts, which leads to a circuitry complication which has as a consequence an increase of costs and circuit's size.

Moreover, the communication between such general purpose integrated circuits and the microprocessor which controls the focusing of the liquid lens typically occurs through serial interfaces of SPI or I2C type, which add costs, size and complexity to the image capture module.

From what stated above, it appears that the liquid lens technology is sufficiently developed for their successful use as optical element with variable focal length in image capture devices, in particular in coded information readers, and more in particular in imager readers of 1D or 2D bar codes.

For effectively assembling a liquid lens in an image capture device, it is necessary to make a physical connection between the electrodes of the liquid lens itself and the drive circuit.

As shown in FIG. 1, a liquid lens 400 comprises a generally cylindrical hermetically sealed casing, containing the aforementioned two fluids 401, 402. A first electrode 404 typically consists of the lateral wall 405 of the casing and of a peripheral portion 406 of a first base face 407 of the casing, while a second electrode 408 is typically annular, leading to a second base face 409 of the casing opposite the first base face 407. Both electrodes 404, 408 leave a central region 410, 411 of the base faces 407, 409 of the liquid lens 400 free, which acts as an aperture for the passage of the light. The hermetical sealing of the casing of the liquid lens 400 at the apertures 410, 411 is ensured by plates 412, 413 made of a material transparent to the used light wavelength. An insulator 414 separates the two electrodes 404, 408.

In the aforementioned document US 2007/0063048 A1, the liquid lens is supported in a barrel by means of a retention ring screwed in the barrel, and contacting the lens is made by means of lead wires, and possibly by means of a conductive elastomeric O-ring.

US 2008/0037973 A1, which aims at supplying a compact and economical assembly, in order to avoid the direct connection of lead wires to the electrodes of the liquid lens, which would require their insulation, provides for using a barrel supporting the lens, and a housing coupled to the barrel and bearing a sensor. First and second elastic electrodes are provided on the barrel for contact with the electrodes of the liquid lens, and third and fourth electrodes are provided on the housing for contact with the first and second electrodes and with power supply terminals provided on the sensor.

Also US 2008/0239509 A1 aims at a very compact assembly of an image capture module, which provides for a liquid lens. The module comprises a barrel which supports a plurality of fixed focal length lenses and a diaphragm positioned in front of the lenses. Support arms for a liquid lens extend from the diaphragm. The barrel is fixed in a housing which supports a sensor. The contact with a voltage generator for driving the liquid lens is schematically shown as achieved by means of leads outside the housing.

Providing for a diaphragm in an image capture module contributes to determining its F-number f/#=EFL/EPD, wherein EFL represents the focal length of the lens or the lens system, and EPD the diameter or more generally the minimum size of the clear aperture.

A module with a small f/# captures bright images, but is characterised by a limited depth of field. Hence, in the field of autofocus systems, it involves the focal length being changed quite often, even for minimal changes of the distance of the module from the target. On the other hand, a large f/# provides a lower brightness of the images that can be captured, but a greater depth of field, thus reducing the operation of the autofocus system, and therefore increasing the response speed of the image capture module, and in particular the decoding speed in the case of optical code readers.

Therefore, the clear aperture must have an optimal diameter for the intended application, for the typical brightness level of the operating conditions, and for the desired depth of field.

Although liquid lenses per se have a relatively small aperture, which could be considered sufficiently small so as to represent the clear aperture of the image capture module, in most image capture module applications it is proper to provide for a diaphragm.

Although diaphragms with variable aperture are known, the diaphragms used in the image capture modules for optical code readers typically have a fixed aperture, so as to limit costs and complexity.

Starting from the above-mentioned state of the art, and in particular from document US 2008/0239509 A1, the technical problem at the basis of the present invention is to improve the integration of a liquid lens in an image capture module, in particular for an image capture device and even more in particular for an optical code reader of the imager type.

In a first aspect thereof, the invention relates to an image capture module, comprising a liquid lens having a first and a second electrode, a first and a second conductor element in electrical contact with said first and second electrode, respectively, said first and second conductor being each intended for connection with a voltage generator for driving the liquid lens, characterised in that the first conductor element comprises an electrically conductive body having a peripheral region for contact with the first electrode of the liquid lens, and having a light diaphragm aperture in a central region thereof.

Such diaphragm aperture corresponds to the clear aperture (or minimum aperture) of the image capture module.

In the present description and attached claims, under the expression "in contact with" or "for contact" it is intended to mean an electrical contact relationship, but not necessarily with direct physical contact.

By combining the optical function of diaphragm element and the electrical function of contacting the liquid lens in a same electro-optical component, the image capture module according to the invention results extremely compact and economical.

In addition, providing such a single component increases the reliability and repeatability of the assembly, since the electro-optical element, due to its greater size, is more easy to handle than a lead wire. Welding of a lead wire directly on the casing of the liquid lens at a first electrode thereof, that could potentially damage it, is also avoided.

The diaphragm aperture is typically rectangular or circular, but can have more complex shapes.

Preferably, the image capture module further comprises a barrel adapted to support the liquid lens and at least said first conductor element in accordance with a pre-established geometric relationship.

Providing such a barrel allows further increasing the reliability and repeatability of the assembly.

The barrel can act as the second conductor element, or it can support a separate component which acts as said second conductor element.

The pre-established geometric relationship is typically an axial alignment relationship.

Preferably, the second conductor element comprises an electrically conductive body having a peripheral region for contact with the second electrode of the liquid lens, and having a central aperture of size not less than that of said diaphragm aperture.

The second conductor element therefore only has electrical contact function, and its geometry is such that it does not hinder the passage of the light through the image capture module. As for the rest, such a second conductor element offers the same advantages in terms of assembly reliability and repeatability of the electro-optical diaphragm and contact element.

Even more preferably, the barrel comprises a notch, and at least the first of said conductor elements comprises a respective protrusion extended into said notch.

By means of such a provision, the function of leading the electrical contacts outside the barrel, and thus outside the optical part of the module, is combined with that of presetting the orientation in the plane transversal to the optical axis of the, and in particular of the first, conductor elements, further facilitating the assembly reliability, repeatability and simplicity.

Preferably, at least the first of said conductor elements is rigid, so as to prevent misalignments of the liquid lens.

Typically, at least the first of said conductor elements is made of beryllium copper, which has good electrical conductivity and high machinability precision characteristics, such as to allow the creation of a highly defined diaphragm aperture. The conductor elements can be made of other materials having such good electrical conductivity and, as far as the first conductor element is concerned, machinability high precision characteristics.

Preferably, at least one of said conductor elements has a size in the direction of an optical axis of the liquid lens greater than 0.1 mm, in order to further act as a spacer between the liquid lens and the adjacent component of the image capture module.

Typically, the image capture module further comprises fixed optics, comprising one or more lenses, preferably housed in said barrel.

Preferably, the image capture module further comprises a ring for locking the liquid lens, the conductor element(s), and possibly the fixed optics within the barrel.

The contact between the first conductor element and/or the second conductor element, and the electrodes of the liquid lens can occur only by adjoining and compressing by means of the locking ring, but preferably at least the first of said conductor elements is fixed to the respective electrode of the liquid lens by means of conductive glue, conductive springs or conductive spacers.

Typically, the image capture module further comprises a linear or two-dimensional pixel array sensor.

Typically, the pixel array sensor is selected from the group consisting of a CCD sensor, and a C-MOS sensor.

The pixel array sensor is preferably fixed to the barrel in a predetermined geometric relationship with respect to the liquid lens, typically in an axial alignment relationship.

The first conductor element can be arranged upstream or downstream of the liquid lens with respect to the pixel array sensor.

Preferably, at least the first conductor element of the image capture module is connected to the drive voltage generator circuit by means of sliding contact or direct welding of a protrusion thereof, wiring with a welded wire, at least one conductive material spring, conductive glue or conductive paint.

Preferably, the image capture module further comprises a drive circuit of said liquid lens, comprising an H-bridge circuit configured for supplying the liquid lens with a cyclic wave voltage signal, wherein the H-bridge circuit comprises two resistors and two switches, alternately driven one closed and the other one open.

By replacing two of the four switches typically provided in a drive H-bridge of a liquid lens with resistors, considerable advantages in terms of costs and simplicity are obtained.

The Applicant has in fact recognised that a liquid lens, which is substantially a capacitive load, has limited capacitance at the terminals, on the order of a few hundred pF, and absorbs low current, on the order of a few hundred μA.

The Applicant has then perceived that the two power switches of the known H-bridges for driving a liquid lens can be replaced by simple and economical resistors. Indeed, each resistor, to ensure the flow of the necessary current through the liquid lens, can still be sized sufficiently large so as not to short-circuit the H-bridge circuit when the switch in the adjacent branch is closed. The Applicant also has perceived that, due to the low current, the power loss in each resistor when the switch in the adjacent branch of the H-bridge circuit is closed is in any case limited.

More in particular, the H-bridge preferably comprises:
two output terminals, the liquid lens being connected between the two output terminals,
two input terminals, kept at a direct voltage difference of a value comprised within a predetermined range,
a first resistor connected between the first input terminal and the first output terminal,
a second resistor connected between the first input terminal and the second output terminal,
a first switch connected between the first output terminal and the second input terminal, driven closed and open by a first cyclic wave signal,
a second switch connected between the second output terminal and the second input terminal, driven closed and open by a second cyclic wave signal, equal to and in counter-phase with respect to the first cyclic wave signal.

In the present description and attached claims, under "direct voltage difference" or "direct voltage", it is intended to mean a substantially direct voltage signal, which can however have comparatively small oscillations (ripples).

Preferably, the two switches are low power, solid state switches.

In the present description and in the attached claims, under "low power" it is intended to mean a power on the order of 100 mW.

Thanks to the provision of high-resistance resistors, the two remaining switches are flown by low currents, and thus can be made by low power solid state switches advantageously drivable by a sufficiently low level signal, as can be directly supplied by a microprocessor.

In an embodiment, the two switches are comprised of N-mos transistors.

In an embodiment, the two switches are comprised of P-mos transistors.

In an embodiment, a control input of the first switch and a control input of the second switch are connected through an inverter.

Preferably, the control input of the first switch is arranged for connection to a terminal of a microprocessor, and said inverter is a digital inverter.

In an embodiment, a control input of the first switch and a control input of the second switch are arranged for connection to respective terminals of a microprocessor.

Preferably, the H-bridge circuit has discrete components.

Preferably, the drive circuit comprises a direct voltage generator.

Preferably, the direct voltage generator has discrete components.

The direct voltage generator is preferably controllable by a level control block, so as to provide a direct voltage difference of an adjustable value.

Preferably, the level control block is arranged for generating a pulse width modulated signal having an adjustable duty cycle.

The drive circuit preferably comprises a level adapter (voltage lowerer) which converts the direct voltage difference to a lower value direct voltage difference, compatible with digital signals.

The low level direct voltage difference can be used for a feedback control of the level of the voltage generator, and optionally of the control signals of the H-bridge switches, so to compensate for voltage generator drifts.

Preferably, the level adapter comprises a resistive voltage divider.

Preferably, the level adapter has discrete components.

Thanks also to the preferred implementation of the drive circuit by means of discrete components and functional blocks implemented by the microprocessor, communication interfaces are not necessary.

The drive circuit of the liquid lens, and in particular its H-bridge circuit, represent per se inventive aspects, which have general application in driving liquid lenses of image capture modules, independently of the provision of the electro-optical contact and diaphragm element described above.

More in general, the drive circuit of the liquid lens according to the invention, and in particular its H-bridge circuit, are advantageous also in the case of a liquid lens image capture module without autofocus or variable focusing, i.e. wherein the liquid lens is used with a drive voltage of constant root mean square value. Practical applications comprise, for example, the provision of a single component, settable in the factory as a short-distance reading module or as a long-distance reading module, as well as image capture modules wherein an initial calibration in the factory allows for variations between one liquid lens and another to be taken into account.

Even more generally, the drive circuit according to the invention, and in particular its H-bridge circuit, are advantageous in all applications where it is necessary to supply a cyclic current to a load which has limited capacitance at its terminals, on the order to some hundred pF, and low currents, on the order of a few hundred μA.

In a second aspect thereof, the invention relates to an electro-optical element for a liquid lens image capture module, comprising an electrically conductive body, having a peripheral region for contact with an electrode of a liquid lens, and having a light diaphragm aperture in a central region thereof.

In another aspect thereof, the invention relates to an image acquisition device comprising a liquid lens image capture module as described above.

Preferably, the image acquisition device is an optical code reader.

Preferably, moreover, the optical code reader comprises a microprocessor arranged for carrying out optical code decoding functions, the microprocessor directly controlling the drive circuit of the liquid lens.

BRIEF DESCRIPTION OF THE DRAWINGS

Further features and advantages of the invention will be more evident from the description of some preferred embodiments thereof, made with reference to the attached drawings, wherein.

DETAILED DESCRIPTION

Figure 2:
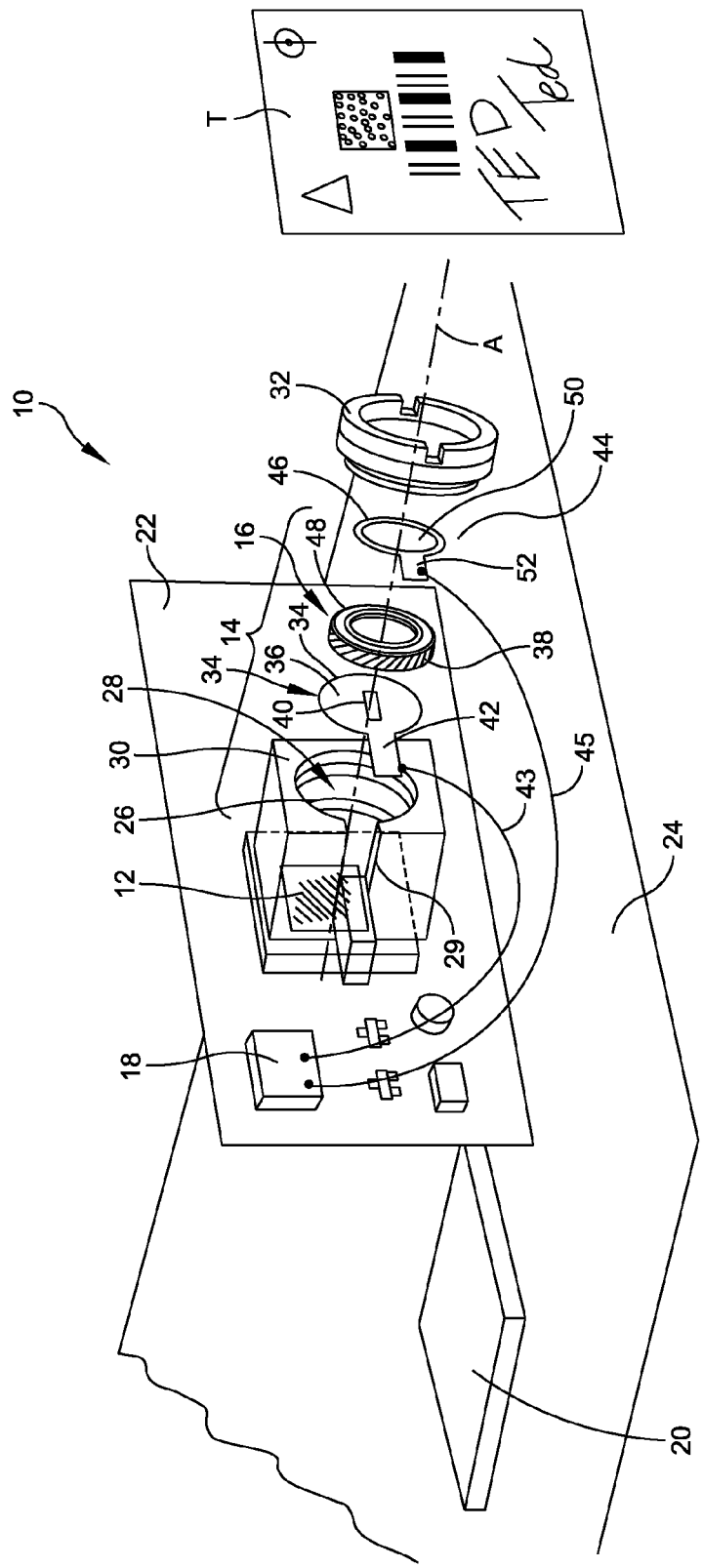
FIG. 2 shows an image capture module according to a first embodiment of the invention, in a partially exploded view, FIG. 3 partially shows an image capture module according to a second embodiment of the invention, in an exploded view.

FIG. 2 shows an image capture module according to a first embodiment of the invention.

The image capture module 10 comprises a photosensitive device or pixel array sensor 12, optics 14 comprising a liquid lens 16, and a drive circuit 18 of said liquid lens.

In FIG. 2, the pixel array sensor 12 and the drive circuit 18 are shown housed on a same printed circuit board 22, but they can be housed on separate printed circuit boards.

The drive circuit 18 is in communication with a microprocessor 20, preferably housed on a second printed circuit board 24, preferably arranged in a plane perpendicular to the first printed circuit board 22.

The pixel array sensor 12 can be of the two-dimensional type as shown in FIG. 2, but it can also be of the one-dimensional type.

The pixel array sensor 12 is preferably made with CCD or C-MOS technology.

The pixel array sensor 12 can be of the monochromatic type, i.e. with grey tones, or of colour type.

The optics 14 have the function of collecting the light coming from a target T and focusing it onto the pixel array sensor 12, with respect to which it is in a predetermined geometric relationship, typically in alignment relationship along an optical axis A.

The optics 14 comprise a fixed or primary optics 26, comprising one or more lenses supported in a cylindrical cavity 28 of a barrel 30.

The barrel 30 is shown with parallelepiped external shape, but it can have any external shape.

The optics 14 also comprise the aforementioned liquid lens 16, which acts as afocal part of the image capture module 10, conferring it the capability to adapt the focusing onto the pixel array sensor 12 to the distance between the module 10 and the target T.

Preferably, the image capture module 10 is of the autofocus type, i.e. the focusing distance is automatically controlled by the microprocessor 20.

Figure 1:
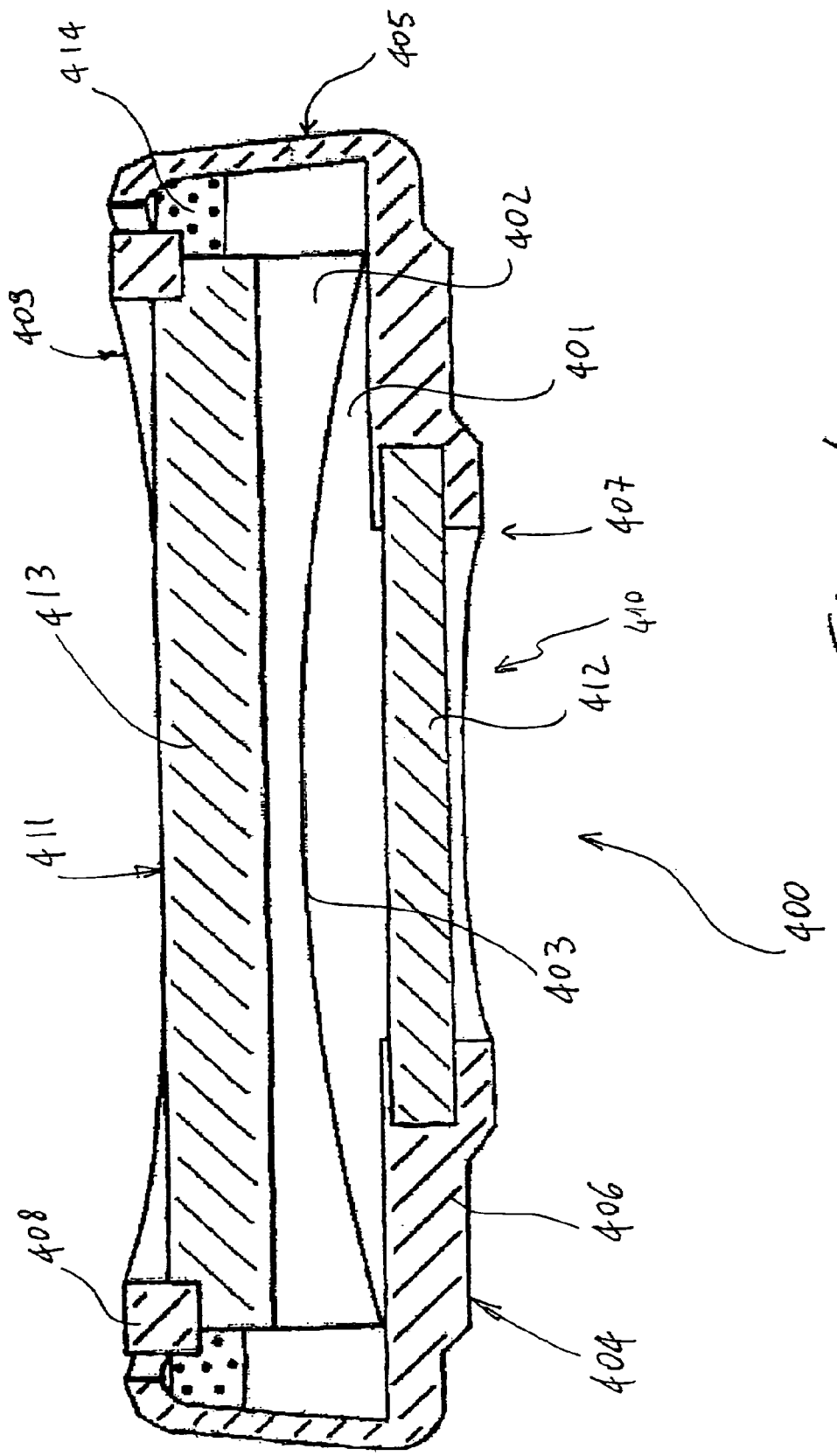
FIG. 1, already described, shows a liquid lens according to the prior art, in cross-section.

The liquid lens 16, of the type of liquid lens 400 shown in FIG. 1, is preferably one of the lenses marketed by Varioptic SA, LYON, France, for example the model Arctic 416 liquid lens.

The liquid lens 16 is also supported in the cylindrical cavity 28 of the barrel 30 and retained therein, for example by means of a locking ring 32.

A first conductor element 34 is supported in the cavity 28 of the barrel 30, adjacent to the liquid lens 16 on a first side, the side downstream of the liquid lens 16 with respect to the pixel array sensor 12 (i.e. going from the target T to the sensor 12) in the embodiment of FIG. 2.

The first conductor element 34 has a circular rigid body, whose peripheral region 36 is in contact with a first electrode 38 of the liquid lens 16, and having a rectangular light diaphragm aperture 40 in a central region thereof, centred with respect to optical axis A.

The first conductor element 34 is preferably made of beryllium copper or another material which has good electrical conductivity and high machinability characteristics, such as to allow the creation of a highly defined diaphragm aperture 40.

The electrical contact between the first conductor element 34 and the first electrode 38 of the liquid lens 16 can be ensured only by the fact that they are stably held in physical contact within the cavity 28 of the barrel 30, also thanks to the locking ring 32 and possible conductive springs or conductor spacers (not shown) interposed between the first conductive element 34 and the liquid lens 16.

Preferably, however, the first conductor element 34 is fixed to the first electrode 38 of the liquid lens 16 by means of conductive glue.

The first conductor element 34 can have a thickness—i.e. a size in the direction of the optical axis A—that is negligible, for example less than or equal to 0.1 mm, or it can have a thickness greater than 0.1 mm in order to act as a spacer between the liquid lens 16 and the fixed optics 26.

The first conductor element 34 also has a protrusion 42 extended in a notch 29 extended in the barrel 30 from its cylindrical cavity 28. The protrusion 42 allows leading the electrical contact with the first electrode 38 of the liquid lens 16 outside the barrel 30, and thus outside the optical part of the image capture module 10.

The protrusion 42 is in turn brought into electrical contact with a first terminal of the drive circuit 18 of the liquid lens 16 by means of a lead wire 43 welded to a possible conductive track (not shown) on the printed circuit board 22.

Alternatively, between the protrusion 42 and the first terminal of the drive circuit 18 of the liquid lens 16 (or the end of the possible conductive track on the printed circuit board 22) a sliding contact or a direct welding can be provided, or an electrical contact made by means of one or more conductive material springs, conductive glue or conductive paint.

The protrusion 42 and the notch 29 of barrel 30 advantageously allow ensuring a predetermined orientation in the plane transversal to the optical axis A of the first conductor element 34, and thus of its diaphragm aperture 40.

In a less preferred alternative, the protrusion 42 can be absent and the electrical contact between the first conductor element 34 and the first terminal of the drive circuit 18 of the liquid lens 16 (or the end of the possible conductive track on the printed circuit board 22) can be made by means of a lead wire directly welded to the peripheral region 36 of the first conductor element 34, extended into the notch 29 of the barrel 30 or into a simple hole.

A second conductor element 44 is supported in the cavity 28 of barrel 30, adjacent to the liquid lens 16 on the side opposite the first conductor element 34, the side upstream of the liquid lens 16 with respect to the pixel array sensor 12 in the embodiment of FIG. 2.

The second conductor element 44 has an electrically conductive body whose peripheral region 46 is in contact with the second electrode 48 of the liquid lens 16, and having a central aperture 50 of size not less than that of the diaphragm aperture 40 of the first conductor element 34, preferably not less than that of the aperture of the liquid lens 16, so as to not hinder the passage of the light through the image capture module 10.

The second conductor element 44 is also preferably made of beryllium copper, but it can also be made of any other material which has good electrical conductivity characteristics, while high machinability accuracy does not have to be a requirement of the material composing the second conductor element 44.

Regarding the electrical contact between the second conductor element 44 and the second electrode 48 of the liquid lens 16 on the one side, and the second terminal of the drive circuit 18 of the liquid lens 16 (or the end of the possible conductive track on the printed circuit board 22), that set forth above with reference to the first conductor element 34 holds true.

In particular, also the second conductor element 44 preferably has an protrusion 52 extended into the notch 29 of barrel 30.

Also the second conductor element 44 can have a thickness of 0.1 mm, or greater for acting as a spacer between the liquid lens 16 and the locking ring 32.

Although in FIG. 2 the first conductor element 34 is substantially flat, its peripheral region could comprise a cylindrical collar sized for being extended around the cylindrical wall of the liquid lens 16, so as to increase the contact area with its electrode 38, corresponding to the electrode 404 of the lens 400 of FIG. 1 in the shown embodiment.

The shape of the conductor elements 34, 44 may more generally vary in order to match the shape of the electrodes of the liquid lens 16.

It should be noted that the focal length of the liquid lens 16 generally varies from positive to negative values, in ranges of comparable absolute values. Hence, the image capture module 10 is in general not affected by an overturning of the lens 16. In other words, the two electrodes 38 and 48 of the liquid lens 16 can indifferently correspond either to the electrodes 404 and 408, respectively, of FIG. 1, as shown in FIG. 2, or vice versa, to the electrodes 408 and 404, respectively, of the lens 400 of FIG. 1. In such case, the shape and size of the peripheral regions 36, 46 of the conductor elements 34, 44 will be inverted.

Also, although the liquid lens 16 with the relative conductor elements 34, 44 is shown upstream of the fixed optics 26 with respect to the pixel array sensor 12, it could also be arranged downstream.

Figure 3:
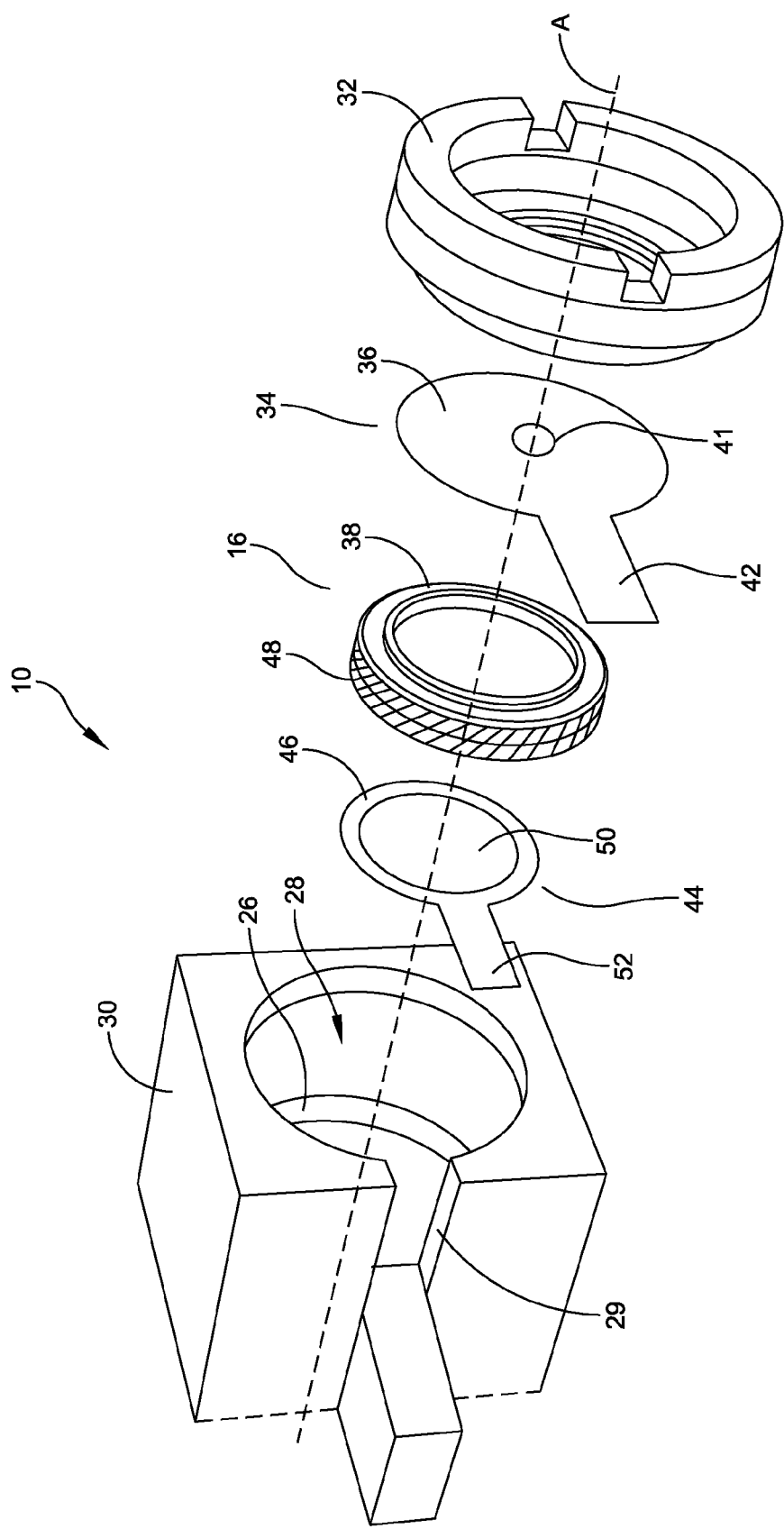

In addition, the first conductor element 34 equipped with the diaphragm aperture can be arranged on the upstream side of the liquid lens 16 with respect to the pixel array sensor 12, arranging the second conductor element 44, lacking the diaphragm aperture, on the side downstream of the liquid lens 16 with respect to the pixel array sensor 12, as shown in the embodiment of FIG. 3.

In the embodiment of FIG. 3, a diaphragm aperture 41 of circular shape is also shown, only as an example of the fact that such diaphragm aperture can have any shape and size, suited for the desired optical characteristics of the image capture module 10.

As for the rest, the embodiment of FIG. 3 corresponds to that shown in FIG. 2. For the sake of simplicity, some elements have been omitted from FIG. 2.

In both embodiments, the second conductor element 44, lacking the diaphragm aperture 40, 41, could be replaced by a direct connection of the respective lead wire 45 with the second electrode 48 of the liquid lens 16.

Also, in both embodiments, the barrel 30 itself, made of a conductive material, could act as second conductor element 44. In such case, suitable insulation means will of course have to be provided between the first conductor element 34 and the barrel 30.

The first conductor element 34 therefore embodies, according to the present invention, an electro-optical component that combines the electrical function of contact element of the liquid lens 16, with the diaphragm optics function.

The diaphragm aperture 40, 41 determines the clear aperture EPD of the image capture module 10 of the invention, increasing its f/# with respect to the case where the diaphragm aperture 40, 41 is absent, the focal length f and thus the drive voltage of the liquid lens 16 being equal.

Due to the f/# increase, the image capture module 10 therefore has a fair depth of field for any drive voltage of the liquid lens 16. An autofocus system, such as that described below, which provides for changing the drive voltage of the liquid lens 16 in order to adapt its focal length to the target distance T, thus only intervenes upon changes of the target distance T of a considerable size. The autofocus system is therefore less complex, and the response speed of the image capture module 10 is improved.

Figure 4:
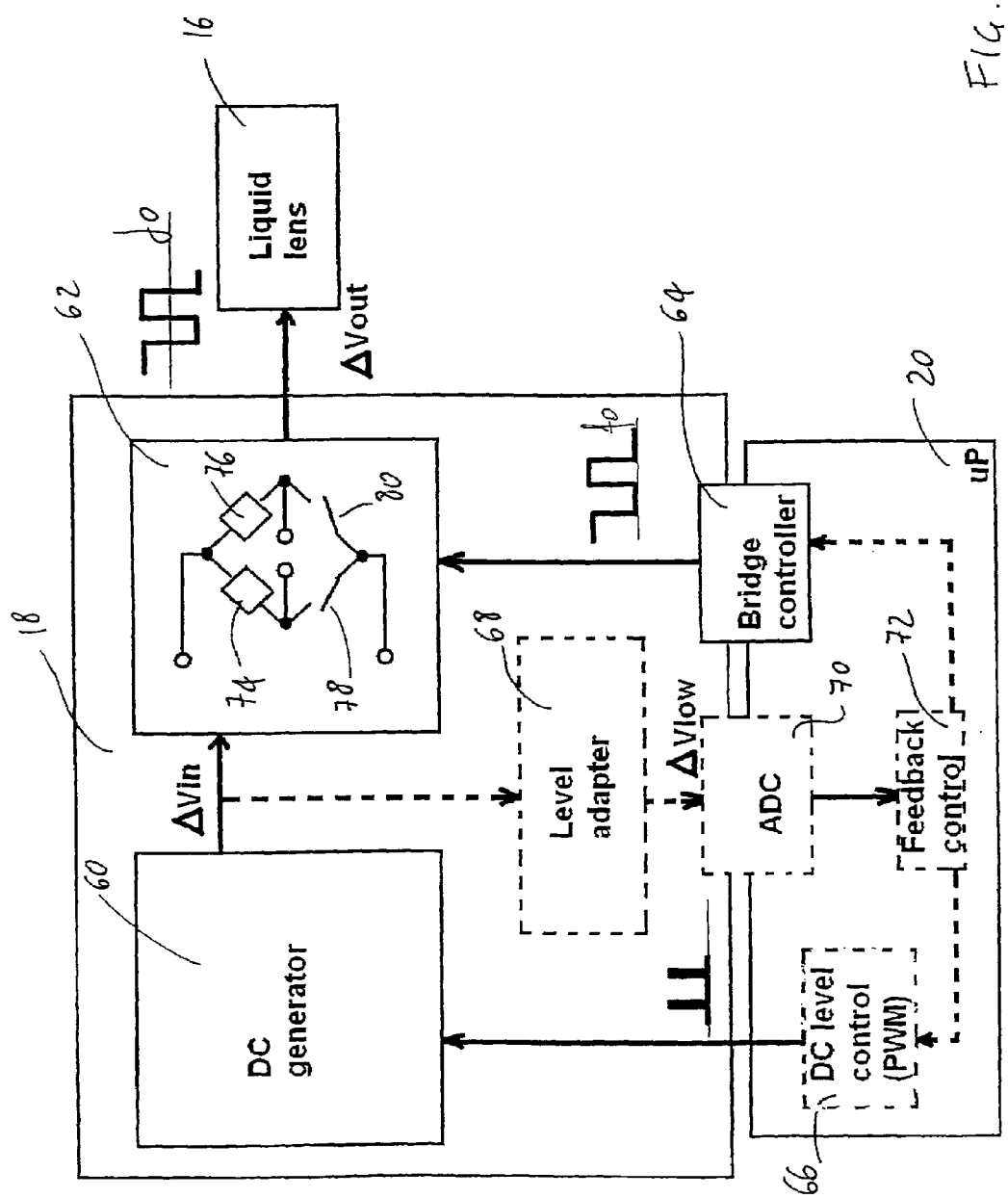
FIG. 4 is a block diagram related to a drive circuit of a liquid lens, connected to a microprocessor.

FIG. 4 is a block diagram related to the drive circuit 18 of the liquid lens 16 of the image capture module 10, connected to the microprocessor 20. In the block diagram of FIG. 4, the optional components and connections are shown with dashed lines.

The drive circuit 18 comprises a direct voltage generator 60 which generates a direct voltage difference $\Delta Vin$, and an H-bridge circuit 62.

The H-bridge circuit 62, controlled by a bridge control block 64, cyclically reverses, at a frequency f0, the direct voltage difference $\Delta Vin$, supplying the liquid lens 16 with a cyclic wave voltage signal $\Delta Vout$ having a peak-to-peak value and a root mean square value RMS correlated with the direct voltage difference $\Delta Vin$.

The H-bridge circuit 62 preferably has discrete components.

The bridge control block 64 is preferably implemented at least in part by the microprocessor 20.

The direct voltage generator 60 preferably has discrete components.

The direct voltage generator 60 is preferably controllable by a level control block 66, so as to supply a direct voltage difference £Vin of an adjustable value.

The level control block 66 is preferably implemented by the microprocessor 20.

In the case of the Varioptic S.A. lens, the direct voltage difference $\Delta Vin$ is adjustable between 0 and 60 V c.c., so that the alternating voltage $\Delta Vout$ supplied to the liquid lens 16 has a peak-to-peak value adjustable between 0 and 120V, and a root mean square value RMS adjustable between 0 and 60 V. The frequency f0 of the alternating voltage difference $\Delta Vout$ is, in the case of the Varioptic S.A. lens, comprised between 1 and 2 kHz.

The drive circuit 18 optionally comprises a level adapter (voltage lowerer) 68 which converts the direct voltage difference $\Delta Vin$ into a direct voltage difference at a lower value $\Delta Vlow$.

The level adapter 68 preferably has discrete components.

The low level direct voltage difference ΔVlow is preferably on an order of magnitude compatible with digital components, preferably comprised between 0V and 5V, more preferably comprised between 0V and 2V.

The low level direct voltage difference ΔVlow is supplied, through an analogue-to-digital converter 70, to a feedback control block 72, which drives the level control block 66, and optionally the bridge control block 64, so as to stabilize the direct voltage difference ΔVin supplying the H-bridge 62 at the desired level.

The feedback control block 72 is preferably implemented by the microprocessor 20.

The analogue-to-digital converter 70 can be integrated within the microprocessor 20 or it can be part of the drive circuit 18 and, in such case, it preferably has discrete components.

As diagrammatically shown in FIG. 4, the H-bridge circuit 62 comprises two resistors 74, 76 and only two switches 78, 80, which are alternately driven, one closed and the other open, respectively, by the bridge control block 64.

In this respect, the H-bridge circuit 62 differs from the H-bridge circuits typically used for driving liquid lenses, which, as described in the above introductory portion of the present disclosure, have instead four power switches, controlled so as to alternately close the pairs of switches arranged in opposite branches of the bridge.

The Applicant has indeed recognised that a liquid lens, which is substantially a capacitive load, has limited capacitance at its terminals, on the order of a few hundred pF, and absorbs low current, on the order of few hundred μA.

The Applicant has then perceived that the power switches can be replaced by resistors. Indeed, each resistor 74, 76, respectively, to ensure the flow of the necessary current through the liquid lens 16 when the switch 78, 80, respectively, in the adjacent branch of the H-bridge circuit is closed, can still be sized sufficiently large so as not to short-circuit the two inputs of the H-bridge circuit when the switch 78, 80, respectively, in the adjacent branch of the H-bridge circuit is closed.

The Applicant has also perceived that, due to the low current, the loss of power in each resistor 74, 76, respectively, when the switch 78, 80, respectively, in the adjacent branch of the H-bridge circuit is closed is in any case limited.

In addition, thanks also to the embodiment of the drive circuit 18 by means of discrete components, and functional blocks implemented by the microprocessor 20, communication interfaces are not necessary.

Figure 5:
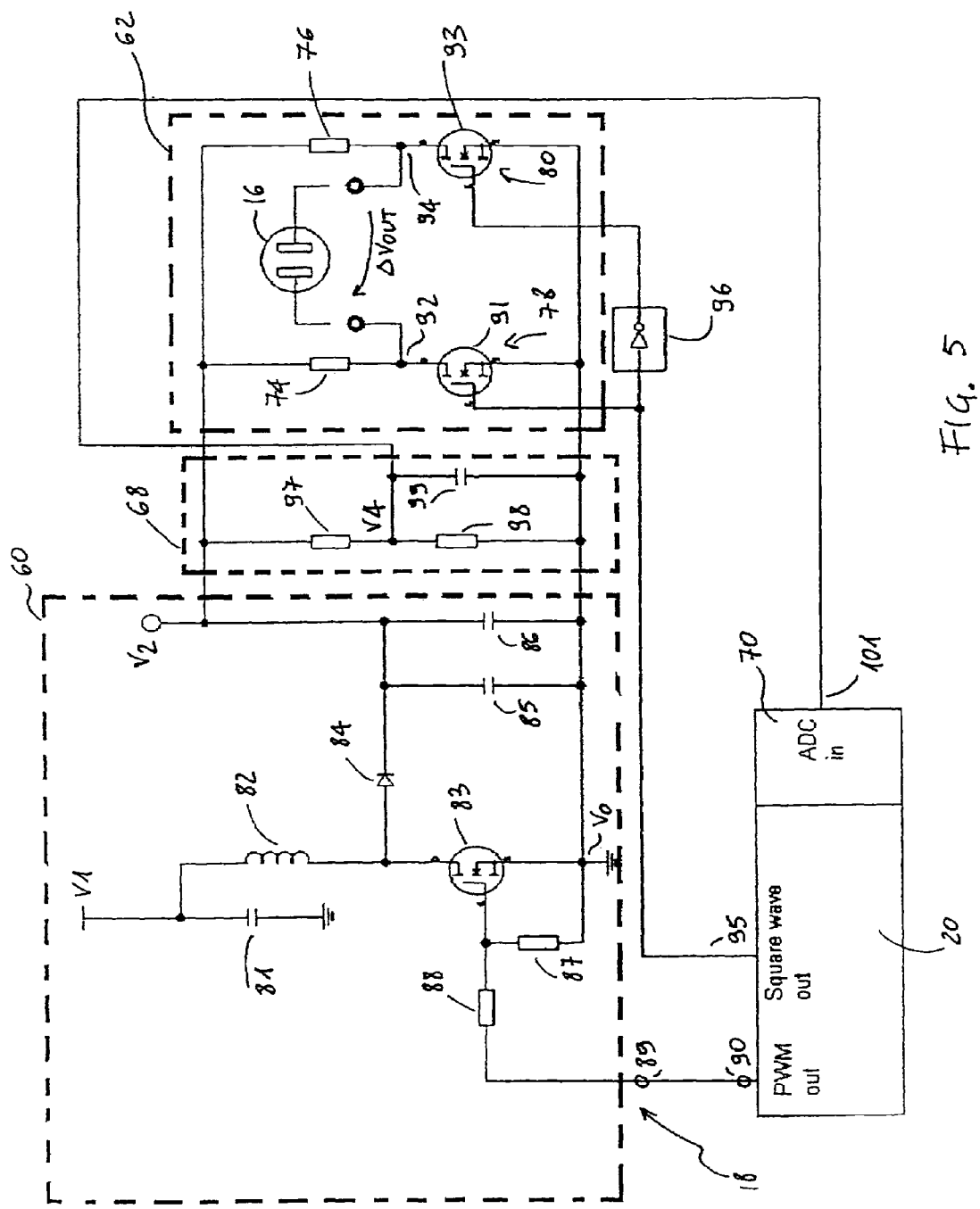
FIGS. 5-12 are circuit diagrams of some embodiments of a drive circuit in accordance with the block diagram of FIG. 4.

FIG. 5 is a circuit diagram of a first embodiment of a drive circuit 18 in accordance with the block diagram of FIG. 4. However, for ease of illustration, the broken line delimiting the H-bridge circuit 62 also encloses the liquid lens 16. In addition, for ease of illustration, the terminals are indicated with the same reference numbers used for indicating the voltages at the terminals themselves.

The adjustable level direct voltage generator 60 is implemented as a voltage level raiser (DC/DC converter), and comprises a terminal kept at a power supply voltage V1, and a terminal kept at a ground voltage V0, the ground voltage terminal V0 being shown in two points for ease of illustration.

The power supply terminal V1 is kept at a low voltage level, preferably compatible with digital components, that can be directly supplied by a power supplier of the microprocessor 20 and of the pixel array sensor 12. For example, the power supply voltage can range between 0 and 5 V, and preferably it is 3.3 V.

A first capacitor 81 is connected between the power supply terminal V1 and the ground terminal V0.

An inductor 82 is connected between the power supply terminal V1 and the drain of an N-mos transistor 83, whose source is connected to the ground terminal V0.

A rectifier diode 84 is connected between the node formed by inductor 82 and drain of the transistor 83, and an output terminal V2 of the direct voltage generator 60.

A pair of capacitors 85, 86 are connected in parallel between the output terminal V2 and the ground terminal V0.

The gate of transistor 83 is connected to the ground terminal V0 through a resistor 87 and, through a resistor 88, to a drive input terminal 89 of the direct voltage generator 60.

The drive input terminal 89 of the direct voltage generator 60 is connected to an output 90 of the microprocessor 20.

The microprocessor 20 generates, at the output 90, a pulse width modulation PWM signal, having an adjustable duty cycle. Such signal embodies the direct voltage level control block 66.

The PWM signal controls the state of the transistor 83, through the resistors 87 and 88. When transistor 83 is turned on, the inductor 82 stores electromagnetic energy, and the voltage V2 to the H-bridge circuit 62 is sustained by the capacitors 85 and 86. When transistor 83 is turned off, the current in the inductor 82 is not subjected to interruptions and flows through the diode 84, charging the capacitors 85 and 86 to a voltage level V2 higher than V1.

The output terminal V2 of the direct voltage generator 60 is therefore kept at a direct voltage V2 correlated with the duty cycle of the PWM signal according to the formula $V2=V1*1/(1-D)$; wherein D represents the percentage of time that the transistor 83 is turned on with respect to the period of the PWM signal supplied to terminal 90.

For example, for a power supply voltage V1 equal to 3.3 V, when the duty cycle of the PWM signal ranges between 0 and 94.5%, the output voltage V2 of the adjustable voltage generator 60 ranges between 3.3 V and 60 V.

The H-bridge circuit 62 is connected between the output terminal V2 of the adjustable voltage generator 60 and the ground terminal V0. More in particular, the two branches comprising the two resistors 74 and 76 lead to terminal V2, while the two branches comprising the two switches 78, 80 lead to the ground terminal V0.

With reference to the block diagram of FIG. 4, therefore, the direct voltage difference £Vin is equal to V2−V0.

More in particular, the switch 78 is made of a first N-mos transistor 91 whose drain is connected to the resistor 74 at a first output terminal 92 of the H-bridge circuit 62, and whose source is connected to the ground terminal V0; the switch 80 is made of a second N-mos transistor 93 whose drain is connected to the resistor 76 at a second output terminal 94 of the H-bridge circuit 62, and whose source is connected to the ground terminal V0.

The liquid lens 16 is connected between the first and the second output terminals 92, 94 of the H-bridge circuit 62.

The gate of the first transistor 91 is connected with an output 95 of the microprocessor 20.

The gate of the second transistor 93 is connected to the output 95 of the microprocessor 20 through of a digital inverter 96.

The microprocessor 20 generates, at output 95, a square wave signal with frequency f0 which drives the first transistor 91 open and closed.

The digital inverter 96 generates a square wave signal with frequency f0, which drives the second transistor 93 open and closed, in counter-phase with respect to the first transistor 91.

Frequency f0 is for example comprised between 1 and 2 kHz, and can be adjustable.

The square wave signal generated by the microprocessor 20, together with the inverter 96, embody the bridge control block 64.

When the first transistor 91 is closed and the second transistor 93 is open, the first output terminal 92 of the bridge is substantially at ground voltage V0 and, through the pull-up resistor 76, the second terminal 94 is substantially brought to voltage V2, since the voltage drop across the resistor 76 is negligible due to the low current through the liquid lens 16. When the first transistor 91 is open and the second transistor is closed, the second output terminal 94 of the bridge is substantially at ground voltage V0 and, through the pull-up resistor 74, the first terminal 92 is substantially brought to the voltage V2, since the voltage drop across the resistor 74 is negligible due to the low current through the liquid lens 16.

Therefore, the lens 16 is driven by a square wave ΔVout with frequency f0 and peak-to-peak voltage value Vpp substantially equal to twice the direct voltage V2 generated by the direct voltage generator 60. Such square wave ΔVout has a root mean square value RMS substantially equal to the value of the direct voltage V2, and a zero average value.

For example, when the direct voltage V2 has a value comprised between 0 and 60 V, the drive voltage of the liquid lens 16 has a peak-to-peak value comprised between 0 and 120V, a root mean square value comprised between 0 and 60V, and an average value equal to 0 V.

The level adapter (voltage lowerer) 68 is made as a voltage divider, and comprises two resistors 97, 98 series connected between the output terminal V2 of the adjustable voltage generator 60 and the ground terminal V0. A capacitor 99 is connected in parallel to the resistor 98 connected to the ground terminal V0.

The node V4 between the two resistors 97, 98 represents the output terminal of the level adapter (voltage lowerer) 68, and is at a low level direct voltage V4 proportional to the direct voltage V2 generated by the direct voltage generator 60.

Such output terminal V4 is connected with an input 101 of the analogue-to-digital converter 70, incorporated in or connected to the microprocessor 20.

If the microprocessor 20 detects that the low level direct voltage V4 does not correspond, due to direct voltage generator 60 drifts, to the direct voltage V2 desired for driving the liquid lens 16 with the cyclic wave voltage ΔVout of desired value, it adjusts the duty cycle of the PWM signal supplied at the output 90 and/or frequency f0 of the square wave signal supplied to the output 95, thus embodying the feedback control block 72.

Since the sources of the transistors 91, 93 are kept at ground voltage V0, the voltage necessary for turning them on and thus closing the switches 78, 80 is sufficiently low so that such switches 78, 80 are controllable by a signal of a sufficiently low level, as can be directly supplied by a bridge controller 64 embodied by the microprocessor 20, for example between 0 and 5 V.

It is noted that, if in place of the resistors 74, 76 two P-mos transistors were used as conventionally, their sources would be connected to the high voltage terminal V2. In order to drive them, a gate voltage would therefore be necessary on the order of magnitude of V2, apart from the conduction threshold (0.7 V in the case of P-mos transistors), and hence on the order of magnitude of tens of Volts.

Figure 6:
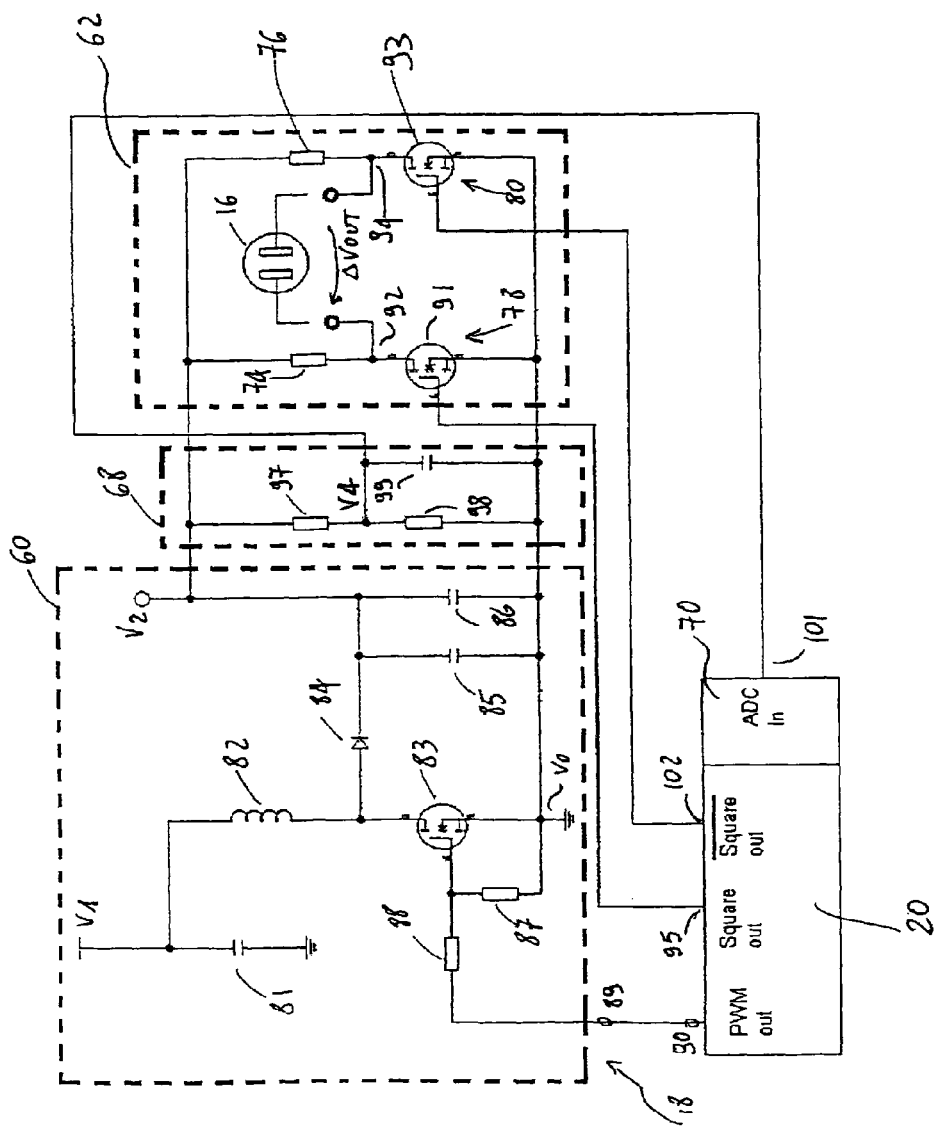

FIG. 6 is a circuit diagram of an embodiment of a drive circuit 18 which differs from that of FIG. 5 only with regard to the implementation of the bridge control block 64.

The digital inverter 96 is absent and the gate of the second transistor 93 is connected to an output 102 of the microprocessor 20.

The microprocessor 20 directly provides for generating, at the output 102, a square wave signal with frequency f0 that is the negation of the square wave signal with frequency f0 generated at the output 95.

The operation of the circuit therefore corresponds to that described above with reference to FIG. 5.

Figure 7:
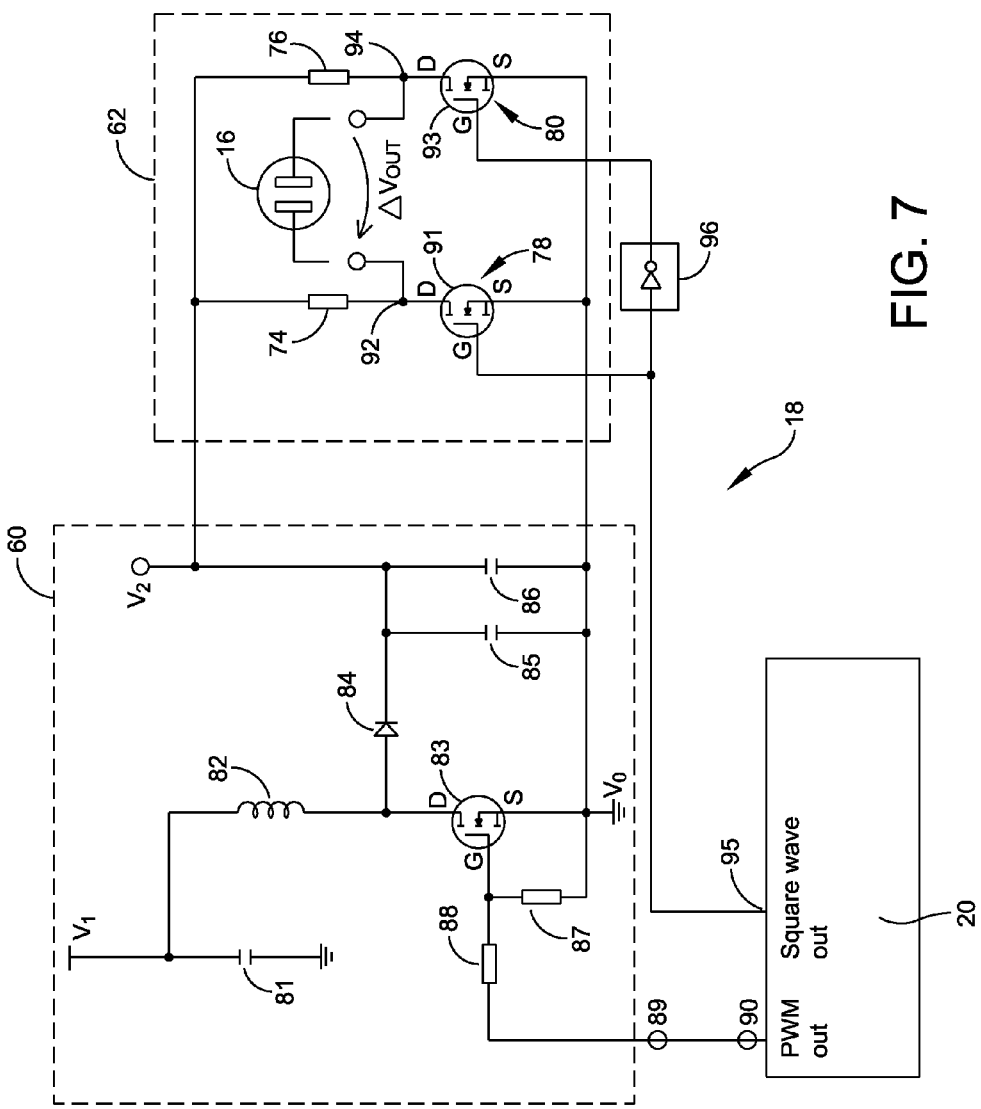

FIG. 7 is a circuit diagram of an embodiment of a drive circuit 18 which differs from that of FIG. 5 only in that it does not embody a feedback control of the direct voltage V2 generated by the direct voltage generator 60. The level adapter (voltage lowerer) 68 and the analogue-to-digital converter 70 are therefore absent.

Figure 8:
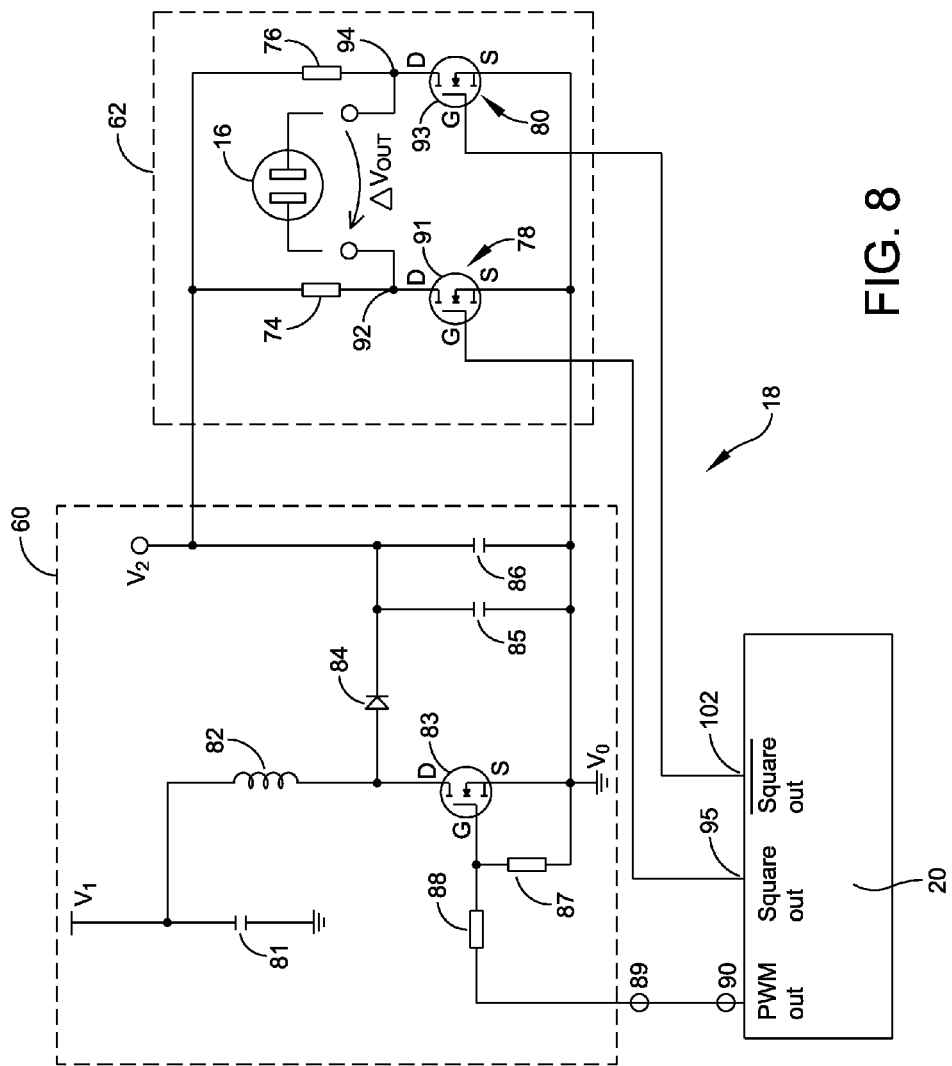

Analogously, FIG. 8 is a circuit diagram of an embodiment of a drive circuit 18 which differs from that of FIG. 6 only in that it does not embody a feedback control of the direct voltage V2 generated by the direct voltage generator 60. The level adapter (voltage lowerer) 68 and the analogue-to-digital converter 70 are therefore absent.

Figure 9:
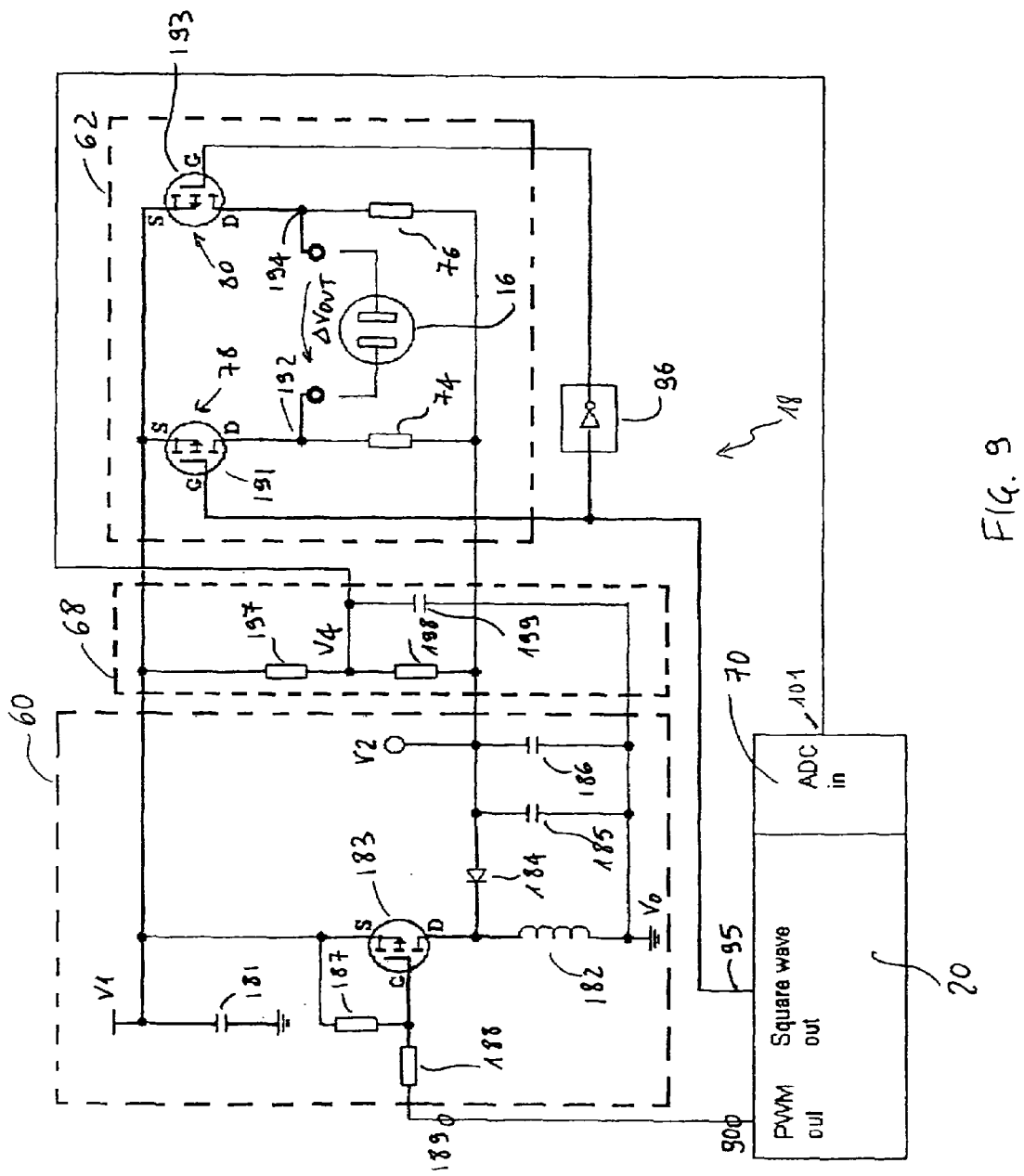

FIG. 9 is a circuit diagram of another embodiment of a drive circuit 18 in accordance with the block diagram of FIG. 4. Also in this case, the broken line delimiting the H-bridge circuit 62 also encloses the liquid lens 16, and the terminals are indicated with the same reference numbers used for indicating the voltages at the terminals themselves.

The components equal to those of FIG. 5 are indicated with the same reference numbers, while the analogous ones are indicated with the same reference numbers, plus 100.

The adjustable level direct voltage generator 60 is implemented as level raiser of the voltage absolute value (DC-DC converter), and comprises a terminal kept at a power supply voltage V1, and a terminal kept at a ground voltage V0, the ground voltage terminal V0 being shown in two points for easy of illustration.

The power supply terminal V1 is kept at a low voltage level, preferably compatible with digital components, as can be directly supplied by a power supplier of the microprocessor 20 and of the pixel array sensor 12. For example, the power supply voltage can range between 0 and 5 V and is preferably 3.3 V.

A first capacitor 181 is connected between the power supply terminal V1 and the ground terminal V0.

An inductor 182 is connected between the ground terminal V0 and the drain of a P-mos transistor 183, whose source is connected to the power supply terminal V1.

A rectifier diode 184 is connected between the node formed by inductor 182 and drain of the transistor 183, and an output terminal V2 of the direct voltage generator 60.

A pair of capacitors 185, 186 are connected in parallel between the output terminal V2 and the ground terminal V0.

The gate of transistor 183 is connected to the power supply terminal V1 through a resistor 187 and, through a resistor 188, to a drive input terminal 189 of the direct voltage generator 60.

The drive input terminal 189 of the direct voltage generator 60 is connected to an output 90 of the microprocessor 20.

The microprocessor 20 generates, at the output 90, a pulse width modulation PWM signal, having an adjustable duty cycle. Such signal embodies the direct voltage level control block 66.

The PWM signal controls the state of the transistor 183, through the resistors 187 and 188. When transistor 183 is turned on, the inductor 182 is charged with electromagnetic energy, and the voltage V2 at the H-bridge circuit 62 is sustained by the capacitors 185 and 186. When transistor 183 is turned off, the current in the inductor 182 is not subjected to interruptions and flows through the diode 184, charging the capacitors 185 and 186 to a voltage level V2 less than V0, i.e. the voltage V2 falls below the ground level.

The output terminal V2 of the direct voltage generator 60 is therefore kept at a direct voltage V2 correlated with the duty cycle of the PWM signal according to the formula $V2=-V1*D/(1-D)$; wherein D represents the percentage of time that the transistor 183 is turned on with respect to the period of the PWM signal supplied to terminal 90.

For example, for a power supply voltage V1 equal to 3.3 V, when the duty cycle ranges between 0 and 94.5%, the output voltage V2 of the adjustable voltage generator 60 ranges between −56.7 V and 0 V.

The H-bridge circuit 62 is connected between the output terminal V2 of the adjustable voltage generator 60 and the power supply terminal V1. More in particular, the two branches comprising the two resistors 74 and 76 lead to terminal V2, while the two branches comprising the two switches 78, 80 lead to the power supply terminal V1.

With reference to the block diagram of FIG. 4, therefore, the direct voltage difference ΔVin is equal to V2−V1.

More in particular, the switch 78 is made of a first P-mos transistor 191 whose drain is connected to the resistor 74 at a first output terminal 192 of the H-bridge circuit 62, and whose source is connected to the power supply terminal V1; the switch 80 is made of a second P-mos transistor 193 whose drain is connected to resistor 76 at a second output terminal 194 of the H-bridge circuit 62, and whose source is connected to the power supply terminal V1.

The liquid lens 16 is connected between the first and the second output terminals 192, 194 of the H-bridge circuit 62.

The gate of the first transistor 191 is connected to an output 95 of the microprocessor 20.

The gate of the second transistor 193 is connected to the output 95 of the microprocessor 20 through a digital inverter 96.

The microprocessor 20 generates, at output 95, a square wave signal with frequency f0 which drives the first transistor 191 open and closed.

The digital inverter 96 generates a square wave signal with frequency f0, which drives the second transistor 193 open and closed, in counter-phase with respect to the first transistor 191.

Frequency f0 is for example comprised between 1 and 2 kHz, and can be adjustable.

The square wave signal generated by the microprocessor 20, together with the inverter 96, embody the bridge control block 64.

When the first transistor 191 is closed and the second transistor 193 is open, the first output terminal 192 of the bridge is substantially at the power supply voltage V1 and, through the pull-down resistor 76, the second terminal 194 is substantially brought to voltage V2, since the voltage drop across resistor 76 is negligible due to the low current through the liquid lens 16. When the first transistor 191 is open and the second transistor 193 is closed, the second output terminal 194 of the bridge is substantially at the power supply voltage V1 and, through the pull-down resistor 74, the first terminal 192 is substantially brought to voltage V2, since the voltage drop across resistor 74 is negligible due to the low current through the liquid lens 16.

Therefore, the lens 16 is driven by a square wave ΔVout with frequency f0 and with a peak-to-peak voltage value Vpp substantially equal to twice the difference ΔVin between the power supply voltage V1 and the direct voltage V2 generated by the direct voltage generator 60. Such square wave ΔVout has a root mean square value RMS substantially equal to the value of the difference between the power supply voltage V1 and the direct voltage V2.

For example, when the direct voltage V2 has a value comprised between −56.7 V and 0 V, the drive voltage of the liquid lens 16 has a peak-to-peak value comprised between 0 and 113.4 V, a root mean square value comprised between 0 and 56.7 V, and an average value equal to 0 V.

The level adapter (voltage lowerer) 68 is made as a voltage divider, and comprises two resistors 197, 198 series connected between the output terminal V2 of the adjustable voltage generator 60 and the power supply terminal V1. A capacitor 199 is connected between the output V4 and the ground node V0.

The node V4 between the two resistors 197, 198 represents the output terminal of the level adapter (voltage lowerer) 68, and is at a low level direct voltage V4 proportional to the difference between the power supply voltage V1 and the direct voltage V2 generated by the direct voltage generator 60.

Such output terminal V4 is connected with an input 101 of the analogue-to-digital converter 70, incorporated in or connected with the microprocessor 20.

If the microprocessor 20 detects that the low level direct voltage V4 does not correspond, due to direct voltage generator 60 drifts, to the direct voltage difference V2−V1 desired for driving the liquid lens 16 with the cyclic wave voltage ΔVout of desired value, it adjusts the duty cycle of the PWM signal supplied at the output 90 and/or the frequency f0 of the square wave signal supplied at the output 95, thus embodying the feedback control block 72.

Since the sources of the transistors 191, 193 are kept at a positive power supply voltage V1 of low level, the voltage necessary for turning them on and thus closing the switches 78, 80 is sufficiently low so that such switches 78, 80 are controllable by a signal of a sufficiently low level, as can be directly supplied by a bridge controller 64 embodied by the microprocessor 20, for example between 0 and 5 V.

It is noted that, if in place of the resistors 74, 76 two N-mos transistors were used, as conventionally, their sources would be connected to the output terminal V2 of the voltage generator 60. In order to drive them, a gate voltage would therefore be necessary on the order of magnitude of V2, apart from the conduction threshold (0.7 V in the case of P-mos transistors), and hence on the order of magnitude of tens of Volts.

Figure 10:
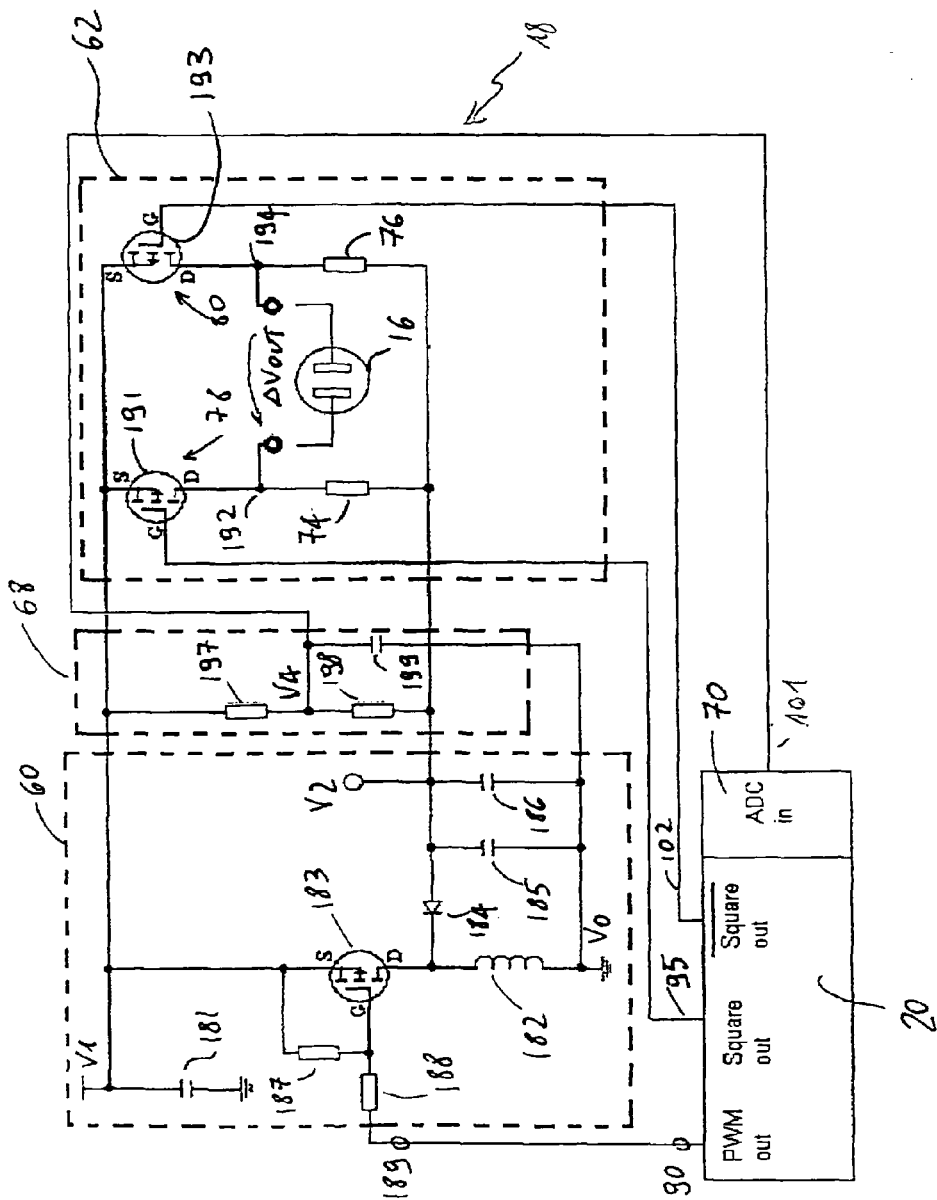

FIG. 10 is a circuit diagram of an embodiment of a drive circuit 18 which differs from that of FIG. 9 only with regard to the implementation of the bridge control block 64.

The digital inverter 96 is absent and the gate of the second transistor 193 is connected to an output 102 of the microprocessor 20.

The microprocessor 20 directly provides for generating, at the output 102, a square wave signal with frequency f0 which is the negation of the square wave signal with frequency f0 generated at the output 95.

The operation of the circuit thus corresponds to that described above with reference to FIG. 9.

Figure 11:
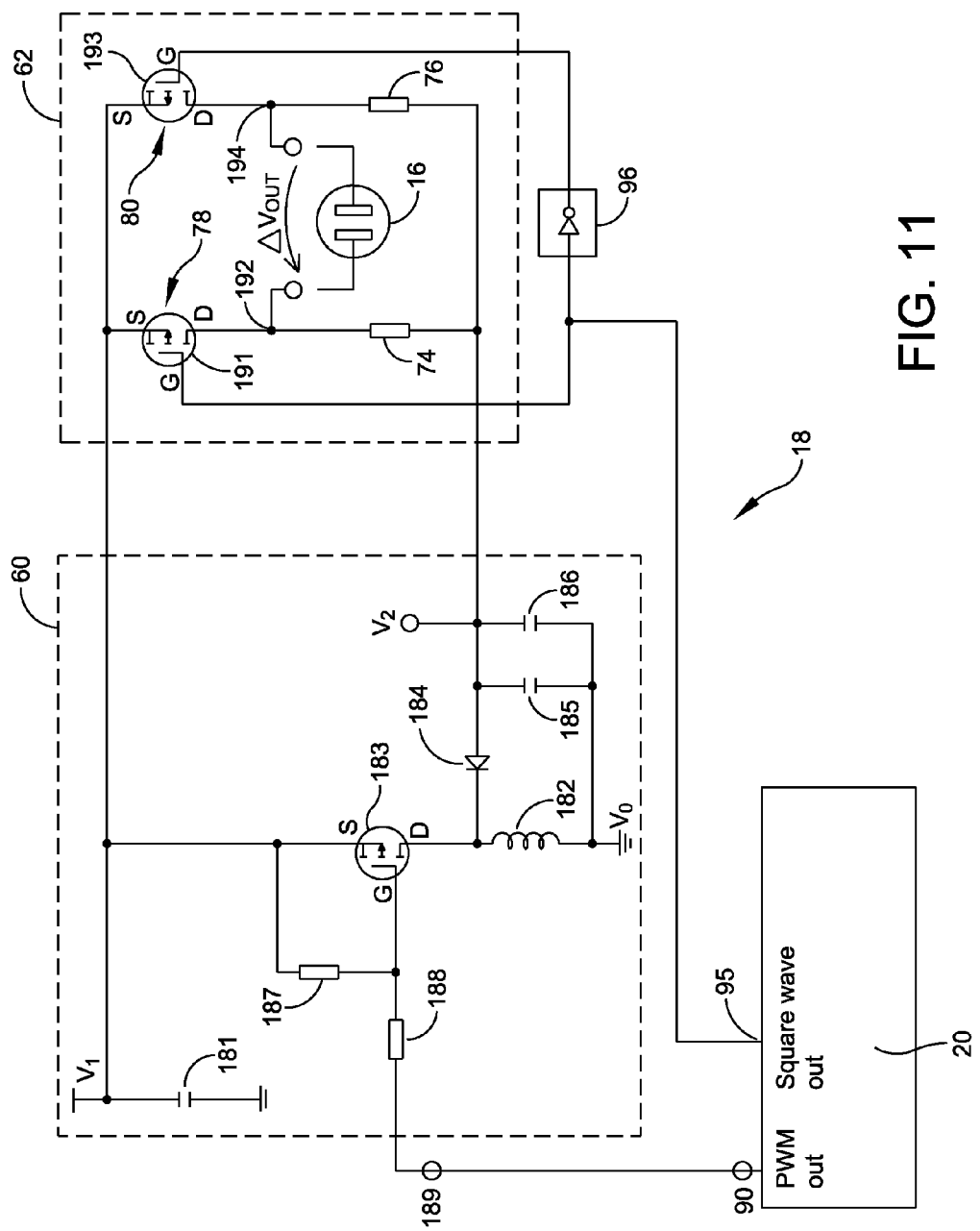

FIG. 11 is a circuit diagram of an embodiment of a drive circuit 18 that differs from that of FIG. 9 only in that it does not embody a feedback control of the direct voltage V2 generated by the direct voltage generator 60. The level adapter (voltage lowerer) 68 and the analogue-to-digital converter 70 are therefore absent.

Figure 12:
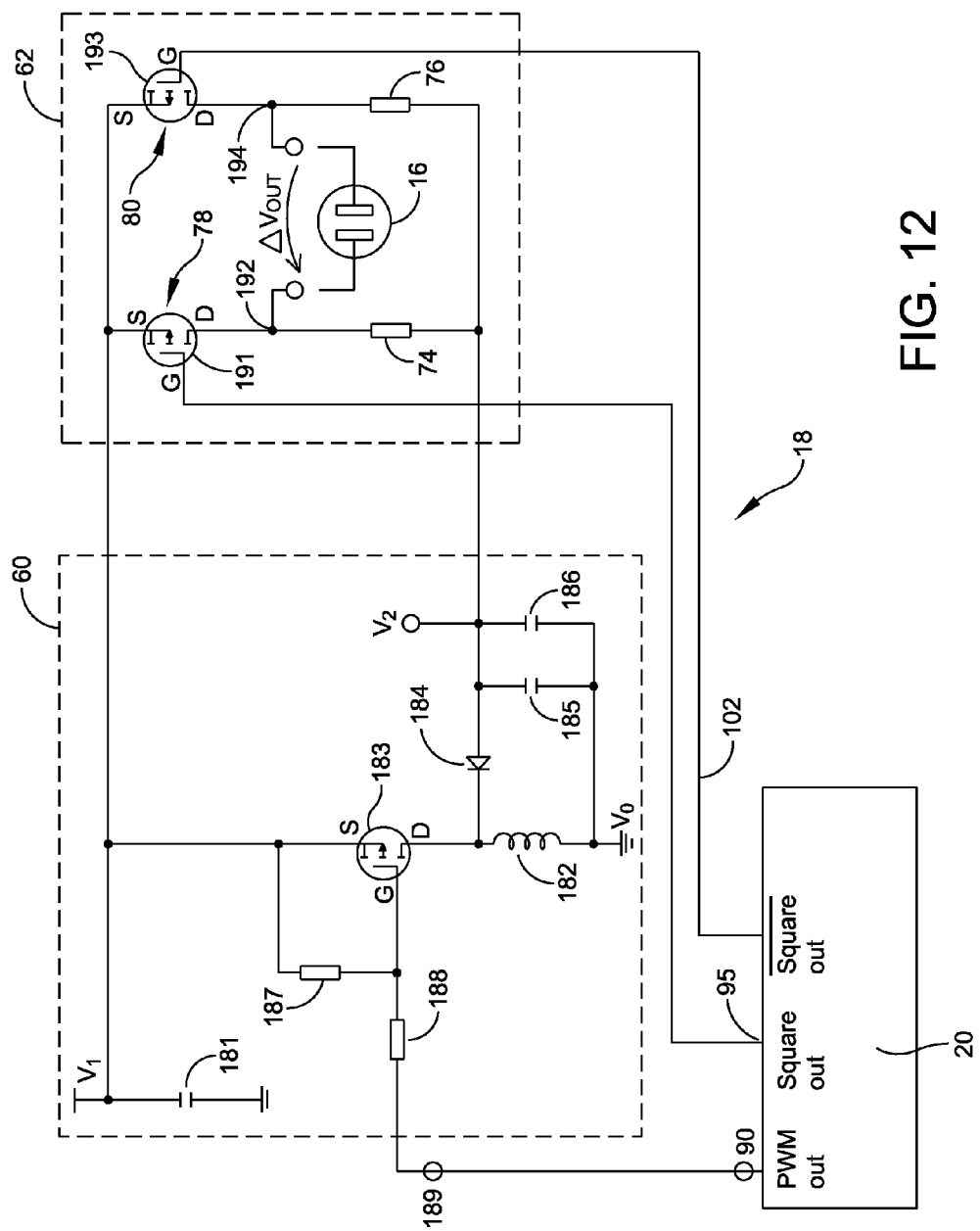

Analogously, FIG. 12 is a circuit diagram of an embodiment of a drive circuit 18 that differs from that of FIG. 10 only in that it does not embody a feedback control of the direct voltage difference V2–V1 generated by the direct voltage generator 60. The level adapter (voltage lowerer) 68 and the analogue-to-digital converter 70 are therefore absent.

The liquid lens image capture module 10 described above can be employed in various image capture devices, such as cameras and film cameras, image and document scanners, optical code readers and devices adapted to supply a combination of such functions.

Figure 13:
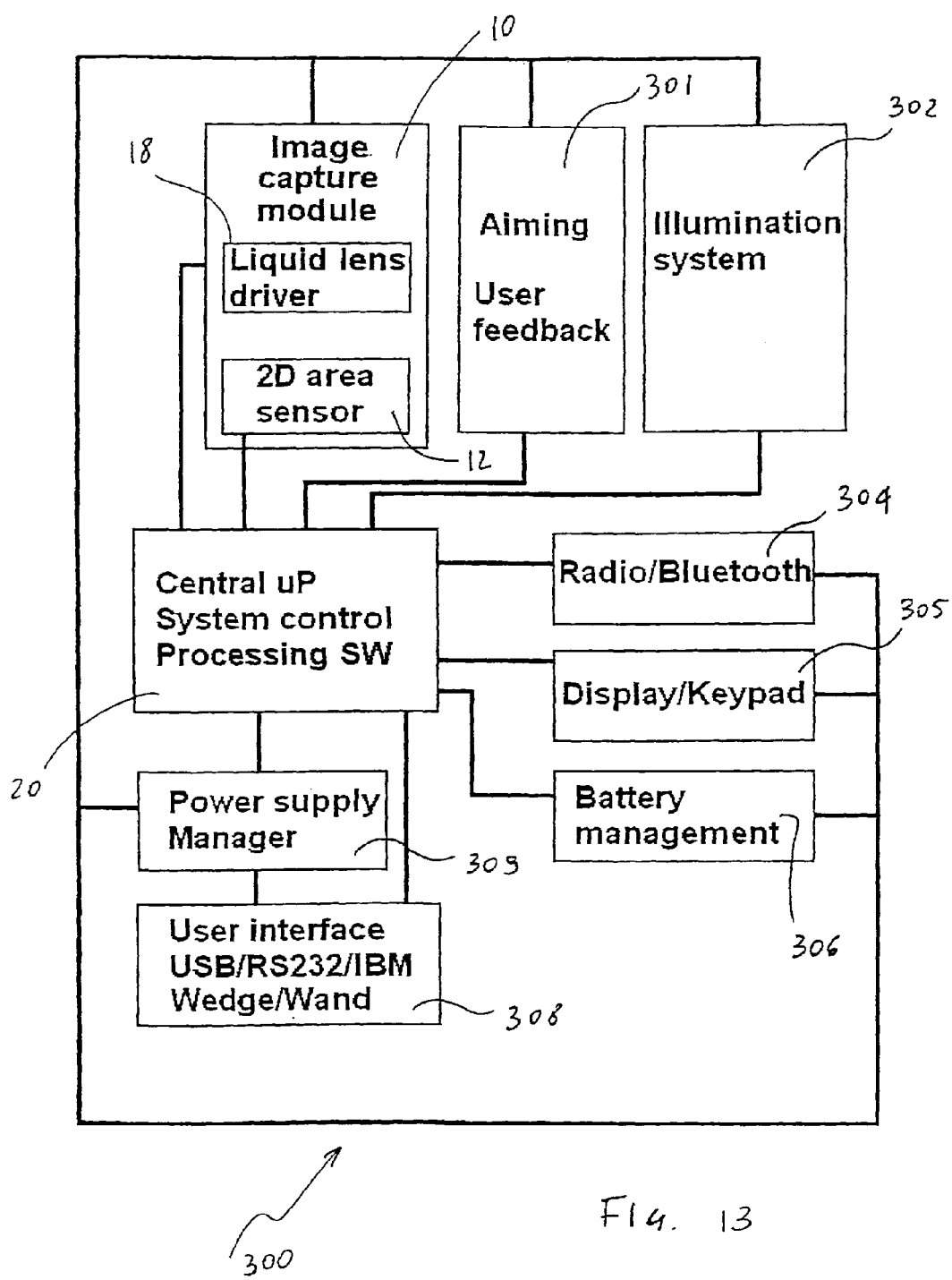
FIG. 13 shows the block diagram of an optical code reader.

FIG. 13 illustrates an exemplifying block diagram of an optical code reader 300 incorporating the image capture module 10 described above, of which the pixel array sensor 12 and the drive circuit 18 of the liquid lens are shown.

The microprocessor 20 is in communication with the drive circuit 18 of the liquid lens in order to carry out the above-described functions.

The microprocessor 20 is also in communication with the pixel array sensor 12 in order to receive therefrom a signal representative of the capture image, containing the optical code.

The microprocessor 20 also contains a module for decoding the optical code or processing of the acquired image.

The microprocessor 20 is also in communication with a module 301 for aiming and signalling to the operator the outcome of the capture and/or decoding of the optical code.

The microprocessor 20 is also in communication with a module 302 for illuminating the target T bearing the optical code.

The microprocessor 20 is also in communication with a wireless communication module 304, for example radio communication according to the Bluetooth protocol.

The microprocessor 20 is also in communication with a user interface module 305, comprising for example a display and a keyboard or a numeric keypad.

The microprocessor 20 is also in communication with a module 306 of management of a power supply battery, such as a battery-charger for a power supply battery.

The microprocessor 20 is also in communication with a module 308 for wired interfacing with an external computer. The interface can for example be of the USB, RS232, IBM, Wedge, Wand type.

The microprocessor 20 is finally in communication with a power supply management module 309, which supplies power to all the subsystems comprising the reader 300.

Those skilled in the art will understand that not all the modules described above are necessarily provided for in the optical code reader 300 and that, on the other hand, other modules can be provided for in the optical code reader 300.

What is claimed is:

1. An image capture module, comprising:
    a liquid lens having a first and a second electrode, a first and a second conductor element in electrical contact with said first and second electrode, respectively, for connection with a voltage generator for driving the liquid lens;
    a circuit for driving said liquid lens, comprising an H-bridge circuit configured for supplying the liquid lens with a cyclic wave voltage signal, wherein the H-bridge circuit comprises only two resistors and only two switches, alternately driven one open and the other one closed,
    wherein the two resistors are sufficiently large to ensure that two inputs of the H-bridge are not short-circuited when either of the two switches is closed and a current through the liquid lens is sufficient.

2. The image capture module of claim 1, wherein the H-bridge circuit has discrete components.

3. The image capture module of claim 1, wherein the H-bridge comprises:
    two output terminals including a first and a second output terminal, the liquid lens being connected between the two output terminals;
    two input terminals including a first and a second input terminal, kept at a direct voltage difference of a value within a predetermined range;
    a first resistor from the two resistors connected between the first input terminal and the first output terminal;
    a second resistor from the two resistors connected between the first input terminal and the second output terminal;
    a first switch from the two switches connected between the first output terminal and the second input terminal, driven closed and open by a first cyclic wave signal; and
    a second switch from the two switches connected between the second output terminal and the second input terminal, driven closed and open by a second cyclic wave signal, equal to and in counter-phase with respect to the first cyclic wave signal.

4. The image capture module of claim 1, wherein the two switches are low-power, solid state switches.

5. The image capture module of claim 1, wherein the two switches include NMOS transistors.

6. The image capture module of claim 4, wherein the two switches include PMOS transistors.

7. The image capture module of claim 1, wherein a control input of a first switch from the two switches and a control input of a second switch from the two switches are connected through an inverter.

8. The image capture module of claim 7, wherein the control input of the first switch is arranged for connection with a terminal of a microprocessor, and said inverter is a digital inverter.

9. The image capture module of claim 1, wherein a control input of a first switch from the two switches and a control input of a second switch from the two switches are arranged for connection to respective terminals of a microprocessor.

10. The image capture module of claim 1, further comprising a drive circuit including a direct voltage generator.

11. The image capture module of claim 10, wherein the direct voltage generator has discrete components.

12. The image capture module of claim 10, wherein the direct voltage generator is controlled by a level control block.

13. The image capture module of claim 12, wherein the level control block is arranged for generating a pulse width modulated signal having an adjustable duty cycle.

14. The image capture module of claim 10, wherein the drive circuit comprises a level adapter which converts a direct voltage difference into a lower value direct voltage difference.

15. The image capture module of claim 14, wherein the level adapter has discrete components.

* * * * *